United States Patent [19]

Dudderar et al.

[11] 4,102,661

[45] Jul. 25, 1978

[54] CAUSTIC RAY USE OF THE DRAWDOWN ZONE OF AN OPTICAL FIBER PREFORM TO CONTROL THE DRAWING OF THE FIBER

[75] Inventors: Thomas Dixon Dudderar, Meyersville; Peter Gerald Simpkins, Chatham Township, Morris County, both of N.J.

[73] Assignee: Bell Telephone Laboratories, Incorporated, Murray Hill, N.J.

[21] Appl. No.: 774,139

[22] Filed: Mar. 3, 1977

[51] Int. Cl.$^2$ ............................................. C03B 37/02
[52] U.S. Cl. ............................................. 65/2; 65/13; 65/29; 65/160; 356/200
[58] Field of Search .................... 65/158, 160, 2, 13, 65/29; 356/199, 200

[56] References Cited
U.S. PATENT DOCUMENTS 3,879,128  4/1975  Presby ........................................ 65/2
3,990,873  11/1976  Knetzlstorfer ............................ 65/13

OTHER PUBLICATIONS

Int. J. Solids Structures, vol. 12, 1976, "The Evolution of Caustics from Holes to Cracks", pp. 377–389, P.S. Theocaris.

*Primary Examiner*—Arthur D. Kellogg
*Attorney, Agent, or Firm*—Peter V. D. Wilde

[57] ABSTRACT

A technique for monitoring the drawdown zone of an optical fiber preform is disclosed. The technique involves detecting the caustic rays emanating from the drawdown zone. Analysis of these rays allows one to determine the geometric properties of both the drawdown zone and the resultant optical fiber. In addition, detailed information concerning the index of refraction distribution in the fiber may be obtained. The process is amenable to realtime applications during the drawing of an optical fiber.

12 Claims, 23 Drawing Figures

FIG. 7A
FIG. 7B
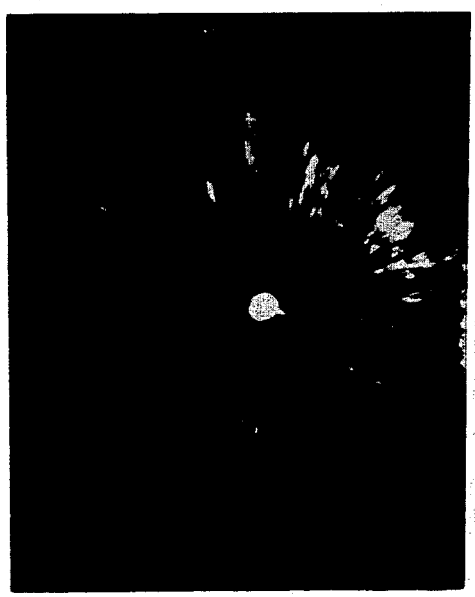
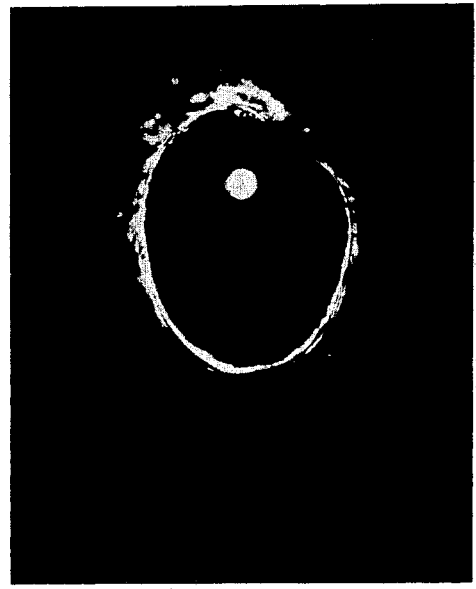
FIG. 6
DOWNSTREAM VIEW
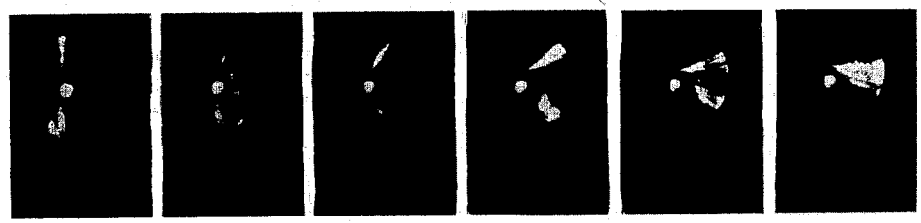
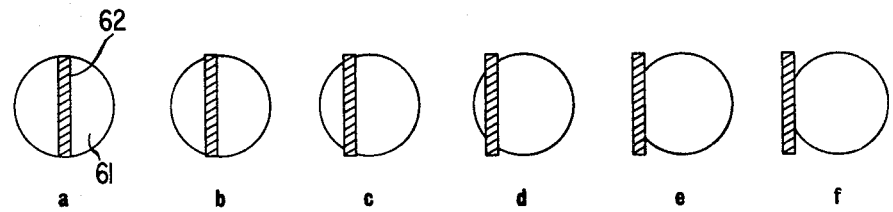
a  b  c  d  e  f
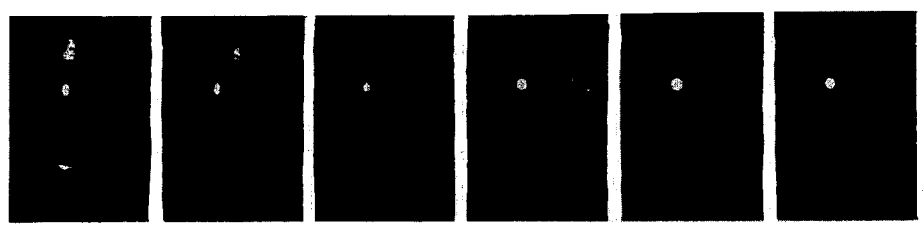
UPSTREAM VIEW θ vs β

CAUSTIC RAY USE OF THE DRAWDOWN ZONE OF AN OPTICAL FIBER PREFORM TO CONTROL THE DRAWING OF THE FIBER

BACKGROUND OF THE INVENTION

1. Field of the Invention

This invention relates to the analysis of optical fiber drawdown zones and more particularly to techniques for monitoring the drawdown zone during drawing processes.

2. Description of the Prior Art

The successful application of optical fibers to long distance transmission systems requires strict adherence to specific design parameters. For example, such fibers must be fabricated with very close tolerances on the fiber diameter, the index of refraction distribution within the fiber, and the number of imperfections, such as microcracks, along the fiber. Because of the strict tolerances placed on the various fiber specifications, detailed techniques for measuring these parameters have been developed.

In U.S. Pat. No. 3,879,128 issued to H. M. Presby on Apr. 22, 1975, a technique is described for monitoring the diameter of an optical fiber. This technique involves scattering light off the optical fiber, detecting such scattered light, and analyzing the resultant interference pattern to extract from it the magnitude of the fiber diameter. Such a process takes on added significance when one realizes how critically the fiber diameter affects the transmission properties of the fiber. In certain transmission modes the fiber diameter must be constant along the length of the fiber to within less than 1 percent, while in other applications the fiber diameter must vary periodically along the fiber length with well defined amplitude and periodicity. Such diameter specifications may be monitored in detail using the Presby technique. However, it should be realized that when the fiber is monitored during the drawing process, the degree to which the information obtained can be effectively used in a feedback loop to control the drawing parameters is limited. The reason for this is that the drawing is done at very rapid speeds and many meters of imperfect fiber will be fabricated before a correction is fully realized. Other schemes for detecting fiber parameters suffer from similar limitations. Namely, they detect the parameters in the fiber after it is drawn, and consequently have limited application to configurations which vary or alter the drawing parameters in response to a feedback signal.

Geometrical optics, upon which the Presby technique is predicated, is a field of physics which was very well understood even before the dawn of the twentieth century. Among the many phenomena that appear in the optics literature is a scattering process which results in areas of increased light intensity known as caustic rays. Such caustic rays have been put to only limited use in the analysis of optical surfaces. An example of such an application may be found in the *International Journal of Solid Structures*, Volume 12, pages 377–389, where caustic ray analysis is described as a technique for measuring the optical quality of glass surfaces. That technique, and techniques similar to it, have however met with only limited success.

SUMMARY OF THE INVENTION

This invention is a technique for monitoring the drawdown zone of an optical fiber preform by analyzing the caustic rays emanating from the drawdown region. Numerous caustic rays may be made to emanate from this region and analysis of these rays allows one to determine the geometrical properties of the drawdown zone as well as the index distribution, and the temperature, of the molten glass within this region. These properties of the drawdown zone may be related to the concomitant properties in the resultant optical fiber. The technique may be used to analyze a "solidifed" drawdown zone, or may be used to monitor the molten drawdown zone during the actual drawing process. In a realtime application, essentially instantaneous feedback may be provided to control the various drawing parameters (e.g., preform feed speed and force, draw speed and force preform temperature, size of drawdown zone) and thereby fabricate an optical fiber with more closely controlled specifications.

BRIEF DESCRIPTION OF THE DRAWINGS

FIGS. 6a–f show the caustic pattern that results when a drawdown zone is illuminated with a slit pattern of radiation;

FIGS. 7a and b show the effects of internal reflection of the caustic ray pattern;

Figure 9:
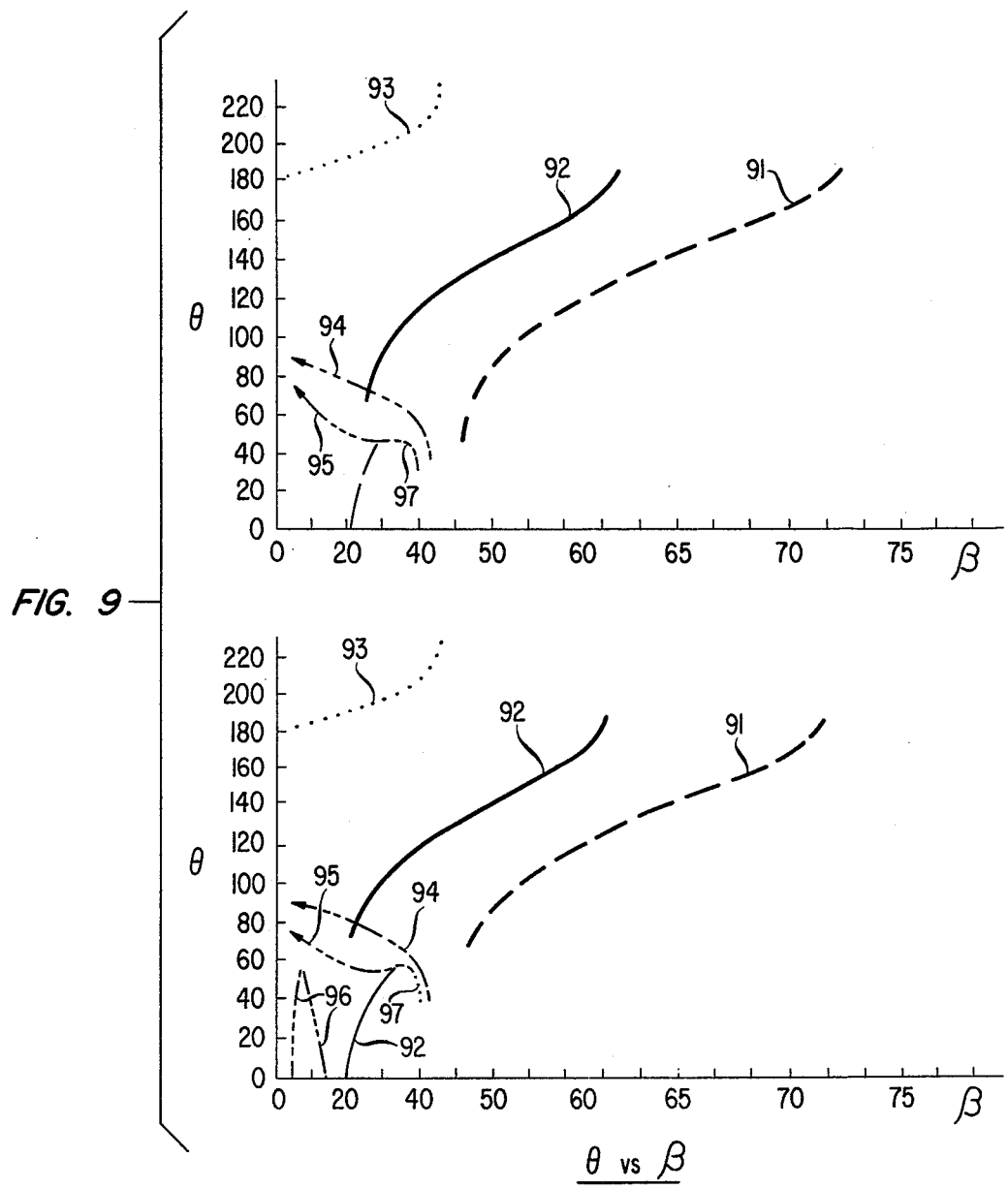

8a–h show the dependence of the caustic rays on the inflection point slope of the drawdown zone;

FIG. 9 is a graphical illustration of the caustic ray dependence of the inflection point slope; and FIG. 10 shows the detection of caustic rays in a furnace drawing apparatus.

DETAILED DESCRIPTION

Figure 1:
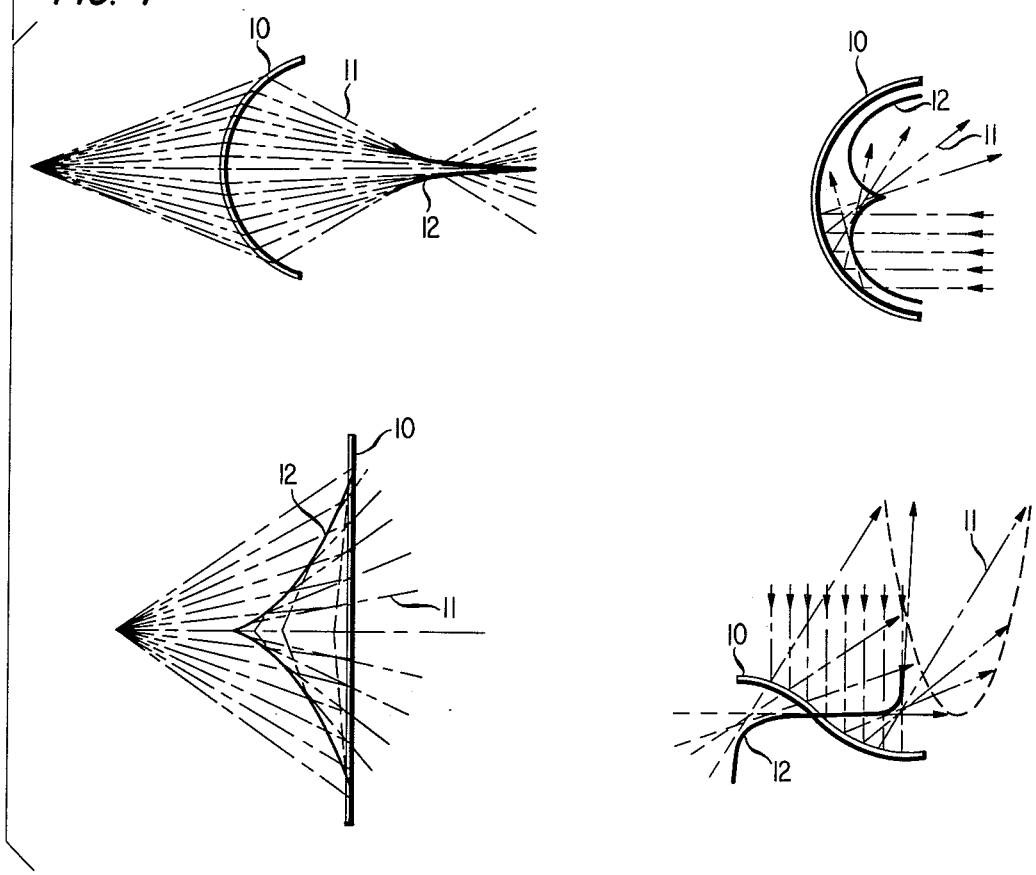
FIG. 1 is a representation of the caustic rays associated with a number of simple surfaces.

When light is either reflected or refracted by a surface the resulting deflected rays of geometric optics may form a distinct envelope. Along the surface of such an envelope the intensity may form a phase independent local maximum. This envelope is known in the literature as a caustic. The phenomenon may be more clearly understood by reference to FIG. 1. In FIG. 1 a number of surfaces 10 are shown, with light being either reflected or refracted from these surfaces. In each case the deflected light rays 11 form an envelope yielding a caustic 12. Normal to the caustic the intensity is characterized by an Airy function-decaying exponentially on one side, the shadow region, and varying harmonically in the opposite direction. For simple geometries the techniques used to calculate the caustic are straightforward. However, when the reflecting surfaces cannot be given analytically, the calculations of the caustic geometry must be done numerically.

Applicants have shown that light deflected from an optical fiber preform drawdown zone may form caustic rays. This deflected radiation may be produced in at least two ways. Light may be made to travel in the preform along the axial direction toward the drawdown zone where it is refracted out of the preform, or light may be externally reflected off the drawdown zone.

Figure 2:
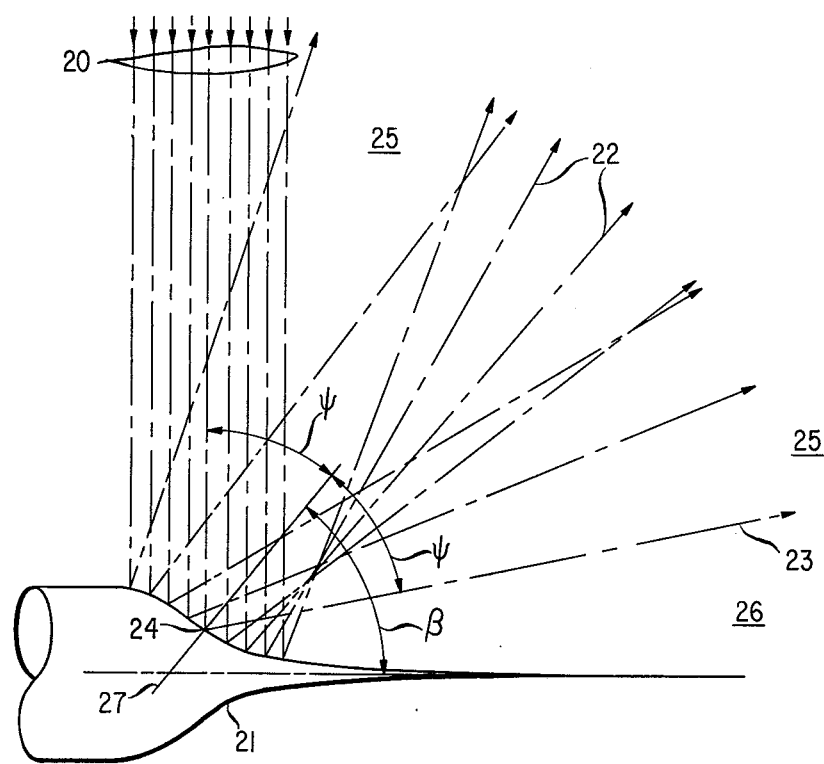
FIG. 2 illustrates the formation of a caustic ray upon external illumination of an optical fiber preform drawdown zone.

FIG. 2 is an illustration of a caustic ray formed by external reflection off the fiber preform zone. In FIG. 2 a collimated illumination beam 20 impinges on the drawdown zone 21. The angle made between the scattered rays 22 and the collimated beam varies depending upon the point on the drawdown zone at which the impinging light strikes the preform. As a result the reflected light forms a fan of rays which fold back on themselves. The largest angle between a reflected ray and the collimated beam occurs for that ray which strikes the drawdown zone at its inflection point 24. The ray which strikes the inflection point reflects off the preform to form ray 23 which then becomes a boundary between the region of reflected light 25 and the region of relative darkness 26. This bounding ray 23 is the caustic ray. Using simple geometry, the angle $2\Psi$ between the caustic ray and the collimated beam may be used to determine the slope of the drawdown zone at the inflection point. The slope of the drawdown zone at the inflection point is measured in terms of the angle $\beta$ between the normal to the drawdown zone at the inflection point 27 and the axis of the preform. It is apparent that the geometrical properties of the drawdown zone may be easily determined whether or not the collimated beam impinges perpendicular to the preform axis.

Figure 3:
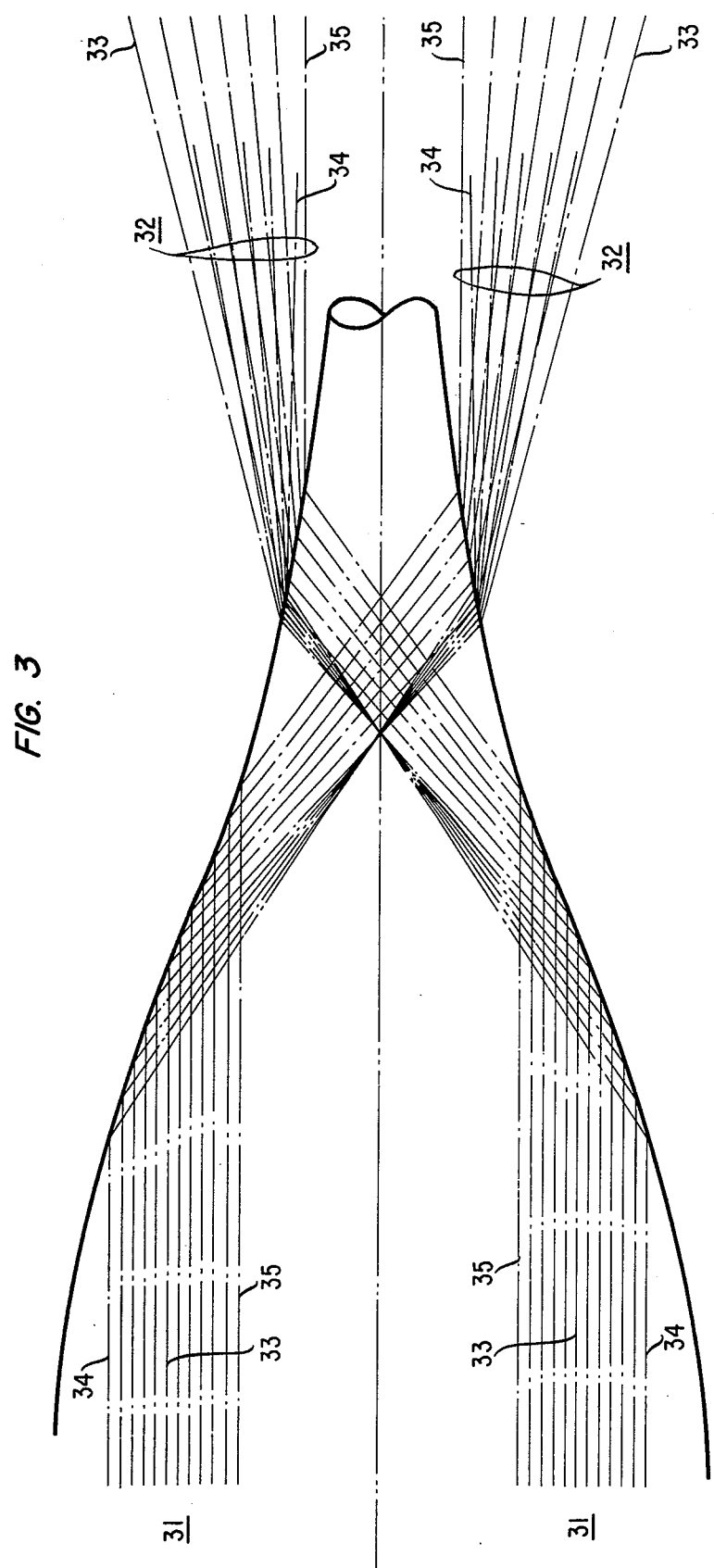
FIG. 3 illustrates the formation of a caustic ray upon internal illumination of an optical fiber preform drawdown zone.

FIG. 3 is a schematic representation of a caustic formed by light traveling within the preform approximately parallel to its axis and toward the drawdown zone. In FIG. 3, the incident rays 31 are again reflected off the drawdown zone, and ultimately refracted to yield a fan of rays 32. The ray 33 which is initially incident in the vicinity of the inflection point of the drawdown zone again forms a caustic boundary. The angle at which this caustic boundary appears is a function of both the geometry of the drawdown zone and the optical properties within the optical fiber preform, some of which may be temperature dependent. While FIG. 3 shows only one type of internal caustic, FIG. 8, to be discussed in detail later, shows numerous types of internal caustics each of which may be dependent on and related to the geometry and optical properties of the preform drawdown zone. Measurement of the location of the various caustics enables the practitioner to determine the geometrical and optical properties of the preform and consequently the geometrical and optical properties of the optical fiber drawn from it. These properties include but are not limited to, the diameter of the fiber as a function of its length, and the index of refraction distribution within the fiber. Asymmetry associated with the preform drawdown zone may also be studied and do not prevent the effective implementation of this technique. The analysis of these optical end geometrical properties forms the basis of this invention.

The practice of this invention envisions the use of a light source, or the natural incandescence of a molten drawdown zone, to deflect light either externally or internally from the preform drawdown zone, and the use of standard light detectors to measure the position of the resultant caustic rays. The light source may either be coherent or incoherent but generally will be collimated. It may emit radiation from the usable ultraviolet, visible, or infrared portion of the spectrum. The detector may be any type of light sensing device such as photomultipliers or solid state light detectors and may include filters to isolate light from a particular source. The particular light source or detection apparatus is not crictical to the practice of this invention and may be vaired by the practitioner, once the essence of this invention is understood, to maximize the sensitivity of the technique. The drawdown zone may be analyzed cold in a "solidified state", or while the drawdown zone is in a molten state during the drawing process. In the following the detailed nature of the caustics and of the experimental techniques used in their detection and analysis will be described. Such a detailed understanding of the caustic rays is helpful for the intelligent application of this invention.

EXAMPLE I

SAMPLE PREPARATION, APPARATUS AND OPERATIONS

Solidified samples of the transition region between the preform and the fiber were cut, and polished square to the axis on the preform end some 50 mm ahead of the drawdown zone. Each sample began at a preform of a uniform diameter between 6.5 mm and 8 mm, and terminated at a fiber diameter of typically 200 $\mu$m. Technically the drawdown region continues much further, to a final fiber diameter of about 100 $\mu$m. Although any glass composition may be used, in this part of our study all the samples were of fused silica with an index of refraction, $n$, of 1.457 at a wavelength of 643.8 nm. Individual samples were mounted in a gimballed mirror mount with 5 degrees of freedom, each with micrometer adjustment. The sample was usually illuminated internally by a light beam entering the preform end parallel to the fiber axis. This technique generated caustics which may propagate in both the upstream and downstream directions relative to the drawing direction. The sample could also be illuminated externally by a beam normal to the fiber axis and incident to the drawdown zone. This alternative generated a reflected caustic from which the maximum gradient of the drawdown profile could be determined.

Figure 4:
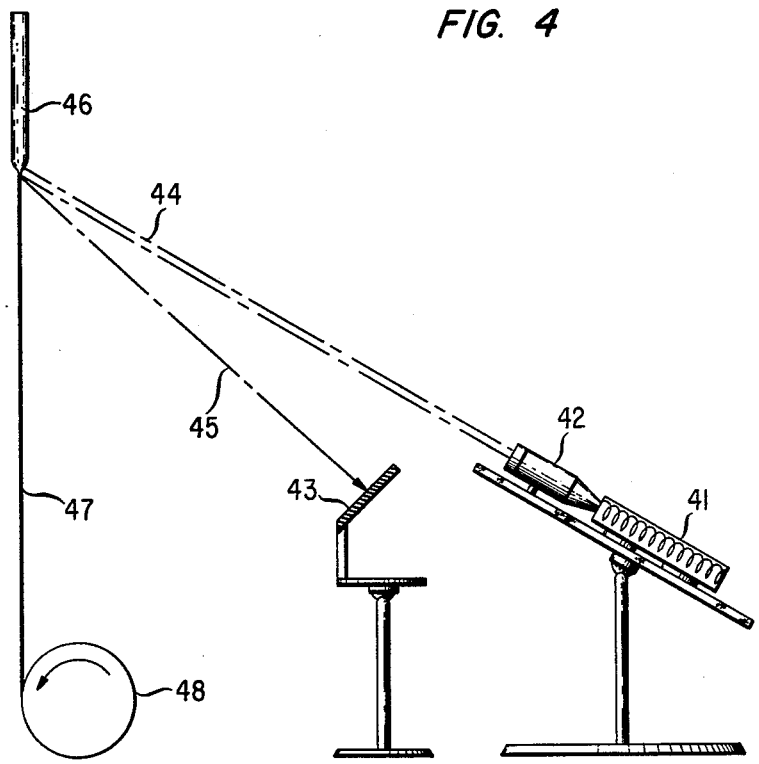
FIG. 4 depicts the detection of an externally deflected caustic ray.
Figure 5:
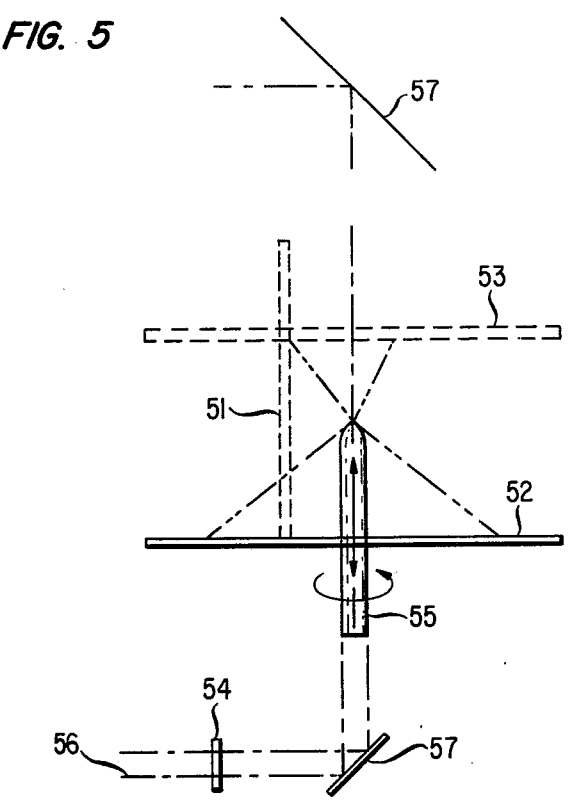
FIG. 5 depicts the detection of an internally deflected caustic ray.
Figure 8C:
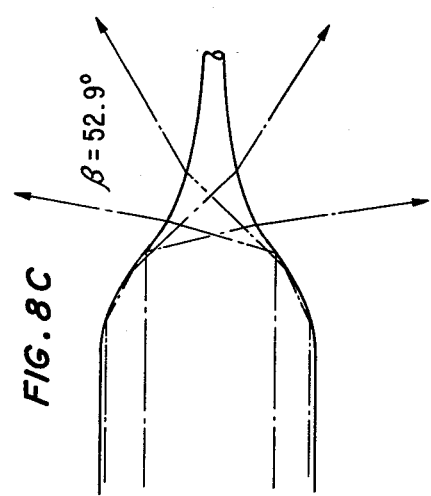
Figure 8F:
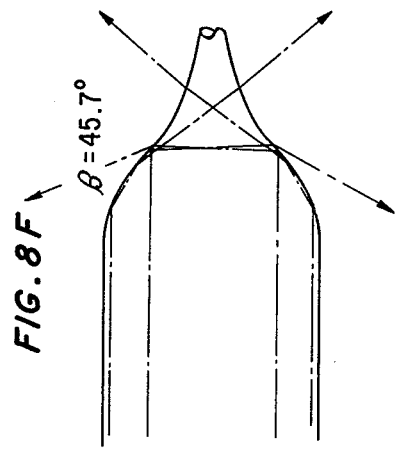
Figure 8B:
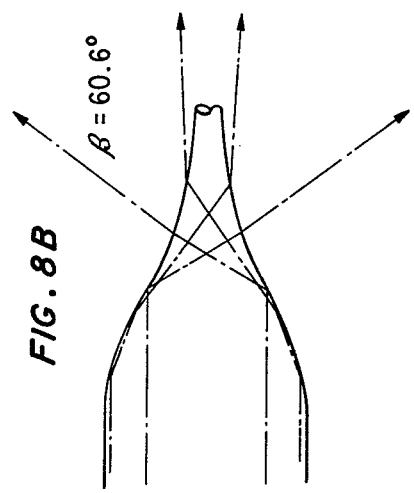
Figure 8E:
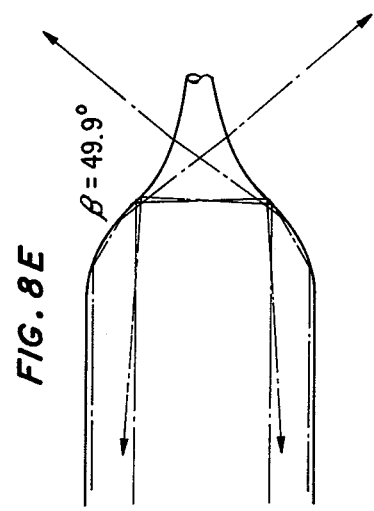
Figure 8A:
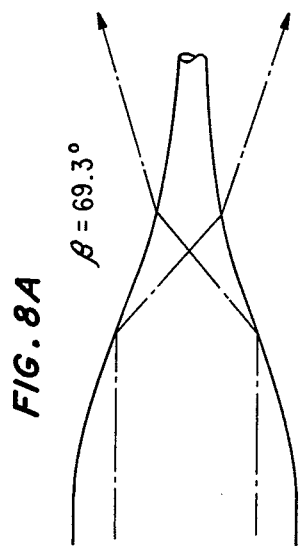
Figure 8D:
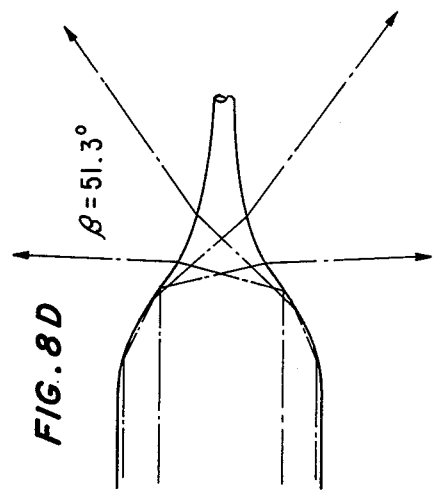
Figure 8I:
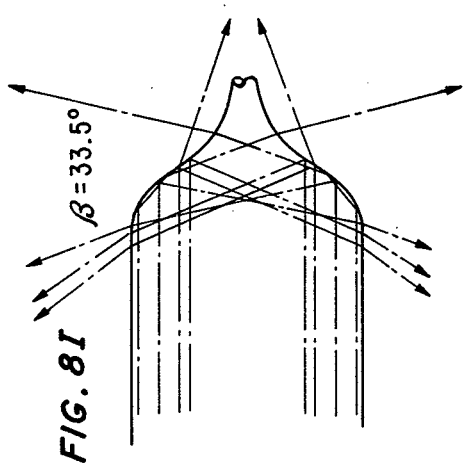
Figure 8L:
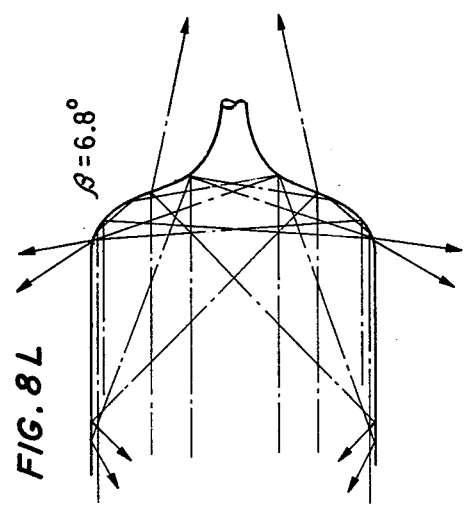
Figure 8H:
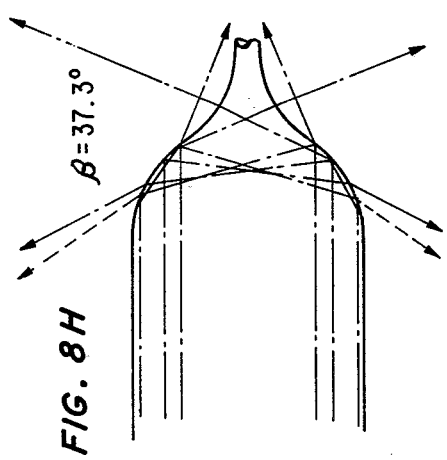
Figure 8K:
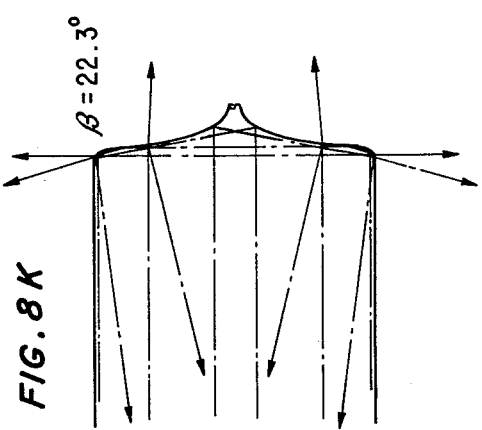
Figure 8G:
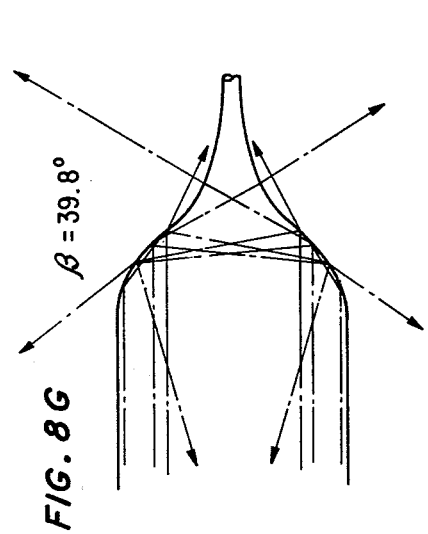
Figure 8J:
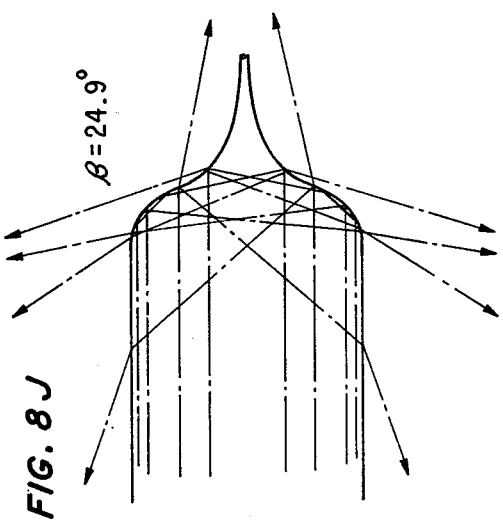

A schematic representation of simple apparatus for detecting caustic rays emanating from an optical fiber preform drawdown zone is shown in FIGS. 4 and 5. FIG. 4 shows an apparatus for detecting an externally reflected caustic. In the specific embodiment of FIG. 4, an optical fiber 47 is shown being drawn from a preform 46 and wound onto a drum 48. The specific drawing technique is not shown but in the practice of this invention any appropriate technique such as the laser or oven drawing processes may be used. In FIG. 4 an Argon Ion or He-Ne laser 41 with $\lambda = 514.5$ and 632.8 nm, respectively, provides the illuminating beam 44. In either case, the beam is expanded through a spatial filter 42 and collimated so that the preform is illuminated by a uniform plane wavefront of greater diameter than that of the preform. The scattered caustic rays 45 may be detected using any appropriate radiation detector. In FIG. 4 a simple photographic plate 43 is shown being used as a detector.

When internal illumination, such as shown in FIG. 3, is used the detecting cofiguration of FIG. 5 is more appropriate. Here 55 is the preform and 56 is the illuminating beam. Optional mirrors 57 are also shown. In FIG. 5, three detecting planes 51, 52 and 53 are indicated. In the detailed study of the caustic phenomenon adjustable slits and diaphragms 54, mounted on two 2-axis micropositioners, where used to illuminate selectively particular regions of the preform cross section. When required, a nonplanar wavefront was generated by inserting a diffuser in the collimated beam at the polished end of the sample.

As shown in FIG. 5, images of the caustic patterns emitted from a particular sample were recorded in planes parallel 51 and perpendicular 52 and 53 to the preform axis. Large magnification photographs of the illuminated drawdown zone, either solid or molten, were taken. These photographs were exposed using a high resolution instrument which comprises a 615 mm, f/6.0 aerial surveillance lens placed in reverse ahead of a 2/m Cassegrain-type telescope. This instrument allows magnifications as large as 100X to be obtained. In both cases the caustic envelopes were evident. Since the molten sample is self-luminescent while the solidified sample is internally illuminated it is concluded that the caustic formation is not critically dependent on the nature of the illumination. Consequently, the data obtained from the solidified samples are representative of the caustics which appear in actual fiber drawing operations.

ESTIMATION OF ACCURACY

Profile measurements of the solidified samples were made on a Nikon optical comparator. Data were recorded every 0.13 mm (0.005 in.) along the profile to an accuracy of 0.005 mm (0.002 in.). These data were used in the geometrical ray tracing procedures and the numerical computations. In the experimental procedure, during which the caustic images were recorded and/or measured, translatory motions were determined to an accuracy of 0.025 mm. However, since the Polaroid film could not be positioned within the film holder more accurately than ± 1.0 mm, all detailed analysis of the caustics were made from data taken by direct measurement of the images displayed on suitable screens. The caustic location was established with a metric scale and a vernier rule. We estimate that, with the screen in a horizontal position, the caustics can be located, with respect to the preform, to within ±0.1 mm vertically and ±0.2 mm horizontally.

Measurements of the maximum gradient of the drawdown profile using the external reflected caustic were found to be repeatable to within 1 percent, and with less care, to within 5 percent. These results were more easily and more accurately obtained by the caustic technique than by analysis of the data obtained by the Nikon comparator.

ORIGINS OF THE CAUSTICS

A diaphragm aperture was used to vary the incident beam diameter to determine wich annular regions within a transverse cross section of the sample transmitted light that contributed to each caustic. Using the configuration of FIG. 5 with a ground glass screen in position 52 or 53, the incident beam diameter was reduced until the caustics disappeared. When the beam and preform diameters were equal, both upstream and downstream caustics were visible. When the beam diameter was reduced approximately 5 percent, the downstream caustic vanished, while the upstream caustic remained unaffected. The upstream caustic remained quite intense until the beam diameter was reduced to between 60 and 55 percent of the sample diameter, when it began to lose intensity rapidly. These observations show that the downstream caustic originates from a region very near the shoulder of the drawdown while the upstream caustic has its source in a region close to the inflection point of the drawdown zone.

OBSERVATIONS WITH PLANAR BEAMS

A series of experiments were performed with the collimated beam passing through a slit 0.89 mm wide and onto the preform in a direction parallel to the axis. In FIG. 6 the images observed with the screen of FIG. 5 in positions 52 and 53 are shown. In FIG. 6, 61 is an end on view of the preform and 62 is a view of the incident beam. FIG. 6 illustrates the changes observed as the planar beam was moved away from the axis. These observations help to identify the ray paths in the drawdown region. Consider first the upstream caustic images. When the beam is coincident with the axis we observe that the caustic is locally illuminated in two separate places 180 degrees apart. The small divergence of the beam, due to diffraction effects, has been magnified substantially by the drawdown geometry. The illuminated regions of the caustics emerge from the side of the drawdown diametrically opposite that of the incident light. Portions of the caustic are not illuminated because the incident beam does not intersect the corresponding regions of the sample. As the planar beam is moved off axis, FIG. 6b, the locally illuminated regions on the caustic move closer together on the opposite side. Eventually, FIG. 6c, the two illuminated regions intersect and the local intensity reaches a maximum. As the planar beam is moved progressively further away from the axis the local intensity decreases rapidly, see FIG. 6d. While FIGS. 6a–c were 1 sec exposures, FIG. 6d is a 5 sec exposure. The extremely low intensity level recorded in FIG. 6e, a 20 sec exposure, shows that very little light from the edge of the sample contributes to the upstream caustic. In fact, the appearance of any caustic illumination at all in that case is probably due to edge diffraction associated with formation of the planar beam. Ultimately, when only half the beam width intercepts the edge of the sample the upstream caustic vanishes, FIG. 6f.

Turning now to the downstream caustic images, also shown in FIG. 6, we again see that for the axial position of the slit, FIG. 6a, two diametrically opposed portions of the caustic are illuminated. This is identical to the phenomenon observed with the upstream caustics. When the incident beam is moved off axis, FIGS. 6b–f, the illuminated portions of this family of caustics also move toward the opposite side and approach each other in a manner similar to the upstream caustic, but more slowly. Consequently, while the upstream caustic has merged once the center of the beam has reached 50 percent of the radius, FIG. 6c, the downstream caustic has not done so until the center of the beam is coincident with the edge of the sample. These pictures illustrate that the downstream caustics originate from rays traveling very close to the surface of the sample which cross the sample in the drawdown zone and emerge from the opposite side, still headed downstream. These ray paths were substantiated by observing the paths of 1 mm diameter beams of light which were refracted downstream from the preform.

PROPAGATION PATHS OF THE EMERGENT CAUSTICS

The experimental determination of the propagation directions of the caustics and the precise location of their emergence from the preform were compared with emerging caustics identified by geometrical ray tracing through a known preform geometry. The ray tracing was performed graphically on a fiftyfold enlargement to assure sufficient accuracy. Excellent agreement between the experimental observation and the graphical ray tracing in a typical sample were obtained.

As a result of the above comparisons, we conclude that the observed caustics do indeed result from light following the paths determined by the graphical ray tracing. The upstream caustic is generated by rays traveling down the sample at about a half radius from the axis which reflect internally only once. These rays thereafter cross the sample and strike the diametrically opposite side of the drawdown region at such an angle that they emerge upstream from the downstream caustics. The reader will recall that a caustic image represents a limiting phenomenon at which the field of emerging refracted rays folds back upon itself. Thus, the upstream caustic represents the furthermost upstream limit that rays can emerge from the preform. It is possible, however, that in certain drawdown geometries the upstream does not appear because the field of emerging rays is terminated at the critical angle. Thus, before the field can fold back upon itself, it is internally reflected. The upstream image from such a sample is shown in FIG. 7a where no caustic line is to be seen at the boundary between the light and dark regions. A similar internal reflection occurs locally in FIG. 7b. The asymmetry of the caustic observed in FIG. 7b and its local extinction are due to asymmetries in the drawdown profile.

Referring now to the downstream caustics, we have established that these arise from light traveling down the sample very close to its surface and being refracted in the downstream direction. Their behavior is otherwise similar to the upstream caustic. Nevertheless, the graphical ray tracing reveals an important distinction between the two caustic families. As will be discussed in the next section the downstream caustic is formed by rays which have reflected twice before crossing the sample and emerging while the upstream caustic is formed by rays that reflect only once before crossing the sample and emerging (see FIG. 8).

THE VARIOUS CAUSTICS

Two principal families of caustics resulting from coaxial illumination of a solidified melt zone sample are of primary interest because they appear over the greatest range of tapers. The first of these caustics is formed by light which reflects internally from a given side, crosses the axis of the melt zone and is refracted out of the opposite side. The second family of caustics arises from light which makes two reflections on the initial side before crossing the axis and refracting out from the opposite side (FIG. 8). Hereafter these first and second caustic families will be referred to as "two-intercept" and "three-intercept" respectively. These caustics are usually referred to as "upstream" and "downstream" caustics because this described their far-field propagation directions as observed in the first experimental samples.

Two caustics of lesser interest will also be noted and briefly discussed later. The first of these is a "one-intercept" caustic which, as its name implies, refracts light out of the glass on its first interception with the surface. The second arises from light which, like the "three-intercept" family, reflects twice from the first side before crossing the sample. However, its interception with the opposite side results in an initial reflection and it finally refracts out of the glass upon its second interception with the second side. This is referred to as a "four-intercept" caustic.

FIG. 3 presents a plot of the rays which are refracted from the drawdown zone in a sample with a $\beta$ of 69.3° in which instance only "two-intercept" light is emitted. Illuminating rays propagating at greater radial distances than ray 34 or lesser radial distances than ray 35 intercept the second side at angles greater than the critical angle, (taken as 43.2°, assuming an index of refraction of 1.46 at the reference wavelength for fused silica). Consequently, they are continuously internally reflected and propagate on down the fiber. Ray 33 represents that ray which is incident approximately at the point of maximum slope and is therefore turned through the greatest angle. Consequently it forms a catacaustic, i.e., a caustic by reflection, within the glass. This caustic travels across through the melt zone and forms a visible external caustic envelope when refracted out on the opposite side. Referring to FIG. 3 we see that rays originating on either side of ray 33 are refracted out at greater angles relative to the normal than the ray initially incident at the inflection point. This will always occur if all the rays between ray 34 and ray 33 have crossed ahead of ray 33 before refracting out. It will be seen, however, that there are instances when these rays arrive at the opposite side and refract out before they all have crossed ahead of ray 33. Then it is possible — if the rate of change of slope in the existing region is sufficiently great — for one of these near-adjacent uncrossed rays to emerge as the extremum or externally visible caustic ray rather than ray 33. In the case of two-intercept caustics, the angular differences between ray 33 and any near adjacent ray which appears as the external caustic ray is rather small for all reasonable geometries. In all the examples we considered, the maximum difference in caustic angle was less than a quarter of a degree.

Finally it should be obvserved in FIG. 3 that the rays between 34 and 35, initially distributed evenly as they propagate down the sample (representing the uniform collimated illumination), become concentrated near the caustic ray as it develops. This concentration of rays symbolizes the intensification of light usually found along the far-field caustic loci associated with ray 33. Conversely, the rays become widely spread approaching the bounding rays 34 and 35 representing a corresponding decrease in intensity.

As $\beta$ decreases, other caustics of the two-intercept family appear which are not associated with the formation of an internal catacaustic at the inflection point. Rather, these result from the refraction of an internal fan of light initially produced by reflection. When it is the final refraction that acts to gather the light into a caustic, the caustic is called a diacaustic.

The three-intercept caustics also involve the formation of an internal catacaustic this time resulting from the interplay between the two initial reflections. In this case, the internal caustic rays originate from axial illuminating rays propagating near the surface of the sample and finally emerge as far field caustic rays after refraction.

In the following section we shall present a largely graphical history of the development of the caustics as a function of the changing geometry of the melt zone. The functional dependence of the various samples studied is very similar.

DEPENDENCE ON GEOMETRY

FIG. 8 is a graphical representation of the functional dependence of the various caustics on the slope of the drawdown zone at the inflection point. FIG. 9 is a plot of $\theta$ versus $\beta$ for the various caustics, where $\theta$ is the angle between the caustic ray and the preform axis. In FIG. 9 the results from two different samples are shown. In FIG. 9, 93 describes the single intercept caustic, 91 a double intercept caustic 94, a second double intercept caustic, 95 a third double intercept caustic, 92 the triple intercept caustic, 96 a quadruple intercept caustic, and 97 represents an internal caustic.

It may be seen from these figures that for preforms with a shallow taper ($\beta > 75°$) no light emerges. However, as $\beta$ falls below 73° the two-intercept caustic first emerges, initially headed downstream in towards the x-axis and along the surface at an angle, $\theta$, of almost 190°. As the taper becomes steeper, and $\beta$ decreases, the caustic ray swings toward the upstream direction reaching an angle $\theta$ of 90° at a $\beta$ of about 50°. Then its rotation accelerates as it approaches extinction by internal reflection at an angle, $\theta$, of 52° and an angle, $\beta$, of about 45.6°. This caustic is the one associated with the internal catacaustic formed at the inflection point. At an angle, $\beta$, of approximately 37.5° the internal caustic, again emerges. However, it is not seen as an external caustic trajectory until $\beta$ has been decreased to less than 34 degrees. Nevertheless, a different two-intercept caustic does become visible even earlier, at an angle, $\beta$, of about 41°. This caustic is not associated with the internal caustic formed by reflection from the inflection point. It also differs from the original two-intercept caustic in that, as the taper increases, it rotates in a direction opposite that of the original two-intercept caustic; i.e., towards greater angles. It may also emerge initially as an intense caustic, but once the incidence angle of the illuminating beam falls below the critical angle, so that most of the light escapes on the first interception, it becomes quite dim. When $\beta$ falls below 16.7° this new caustic ray is again illuminated by a ray critically incident at an angle greater than the critical angle and so it also becomes bright. This caustic's half angle $\theta$ asymptotically approaches 90° as $\beta$ approaches 0°. Referring again to the internal caustic, we see that its rotation is also initially retrograde as $\beta$ decreases. However, once it again becomes visible as the leading two-intercept caustic ray, its rotation reverses. From this point on until its extinction as a $\beta$ of about 22°, this reemergent two-intecept caustic is much less intense than it was during its original appearance. Coincidental with its reemegence, a third dim two-intercept caustic appears. It ultimately rotates in the direction of increasing caustic angle, like the second two-intercept caustic that preceded it.

Careful comparison of FIGS. 8 and 9 shows that, over most of its range, the first, two-intercept caustic, $\theta$ vs $\beta$ relationships are very nearly the same for both samples. However, the second and third two-intercept caustics differ from the first in a number of significant ways. First, the far field ray trajectors are folded opposite the folding of the first caustic ray trajectories. Second, both new caustics rotate to larger rather than smaller caustic angles with decreasing $\beta$. Third, they are not in any way associated with the internal catacaustic originating at the inflection point. This latter aspect is quite significant, because while their functional forms are quite similar for both samples, these additional caustics are quantitiatively the most highly differentiated. This is a result of their origin in rays initially incident well away from the inflection point, where they are more strongly influenced by other aspects of melt zone morphology than just $\beta$.

The three-intercept caustic is also less uniquely involved with the inflection point and shows some differentiation between the two samples over its entire range, starting from its first appearance at an angle $\beta$ of around 61° and an angle $\theta$ of about 185°, down to its extinction at $\beta = 22°$ and a $\theta$ of about 67°. Like the first two-intercept caustic, the three-intercept caustic refracts out normal to the melt zone surface at an angle $\theta$ of aout 110°, but for an angle $\beta$ of only 40° or so. Since its initial emergent caustic angle depends on the downstream surface geometry in much the same way as it did for the original two-intercept caustic, it is not surprising that it too should result in an initial caustic angle, $\theta$, of about 190° tough at a different $\beta$ (10° smaller). In both samples, the initial three-intercept caustic angles are almost identical. Also, for both samples the three-intercept caustics extinguish at very nearly the same 22° $\beta$ angle as do the two-intercept caustics. Actually, the light rays associated with the three-intercept caustic also eventually make a reappearance. In addition, a bright four-intercept caustic resulting from the internally reflected three-intercept caustic does emerge briefly headed in the upstream direction and then disappears, all at $\beta$'s too small to be physically significant.

Finally, there is also a diacaustic (caustic of refraction) which emerges when $\beta$ falls below the critical angle. This caustic is formed by the light which refracts out on its first interception with the surface. The ray which forms the internal catacaustic (and ultimately, the two-intercept caustic) also produces an external extremum when it forms the one-intercept caustic. Because little of the light in the illuminating rays is reflected, once the one-intercept caustic appears, any (but not all) of the two-intercept rays which appear at $\beta$'s below the critical angle are quite dim. Consequently, over most of their range the two-intercept caustics are also dim.

While the second and third two-intercept caustics are unique, in that among other things they never propagate downstream or in towards the fiber axis, the one-intercept caustic is also unique in that it always propagates downstream and in towards the fiber axis. Consequently the one-intercept caustic either follows the surface or reflects off the fiber at some station downstream such that its fundamental rotation as a function of $\beta$ becomes reversed. Since this caustic depends only on $\beta$, its angle is an identical function for all melt zone profiles.

Finally, we may conclude that the most useful caustics for studying fiber drawing melt zones are the first two-intercept caustic and the three-intercept caustic, which together cover a very broad range of geometries. Except at very large $\beta$'s the first two-intercept caustic depends mostly on the melt zone profile around the inflection point and does not differentiate much between samples. By contrast, the three-intercept caustics for different samples are readily differentiated over their entire range.

Though less intense and of rather limited range, the second and third two-intercept caustics are also potentially useful as a means of studying melt zone geometries. These are the most highly differentiated caustics because they involve light which is initially incident either at the start of the melt zone (upstream from the inflection point) as with the second two-intercept caustic, or at the end of the melt zone (downstream from the inflection point) as with the fluid. These caustics are the only primary caustics still visible for $\beta$ below 22°, and together with the one-intercept caustic provide some means of studying extremely blunt melt zones.

It should be realized that since each of the caustics involves a refraction out of the sample, they all may depend on the index of refraction, $n_c$, as well as on the surface geometry. Information from an externally illuminated catacaustic may be used to separate out the $\beta$ dependence of the data obtained from an appropriate internally illuminated caustic. This could provide otherwise unavailable information concerning the index of refraction. For example, consider a melt zone sample of unknown $n_c$ exhibiting a first two-intercept caustic at an angle $\theta$ anywhere between 52 and about 120°. It may be matched with a computer analysis of the present data at an angle $\beta$ determined from direct measurement of the angle of the externally illuminated catacaustic. Adjustment of the $n_c$ value used in the computer analysis to yield an equal theoretical $\theta$ value should provide a good estimate of the unknown index of refraction. The quality of this estimate would depend on how uniform $n_c$ was across the sample and how near the propagation direction of the emerging caustic was to tangency with the surface. With the detection and analysis of more caustics complicated index distributions may be unfolded and related to the distribution within the fiber.

EXAMPLE II

Rigorous verification of the technique's feasibility as a means of monitoring the drawdown zone during actual drawing was confirmed by carrying out experiments with a 12.8 mm diameter sample in a drawing apparatus. This experiment substantiated the establishment of a unique and stable caustic boundary on the viewing screen during the melting and actual drawing of a fiber.

The experiment was conducted using a $CO_2$ laser drawing apparatus and the optical configuration shown schematically in FIG. 4. Illumination was provided by a 2mw CW gas laser and the caustic formed was viewed on a ground glass screen. Because of the extremely low power of the light source, and the intense self-luminosity of the drawdown zone, substantial signal-to-noise ratio problems were expected. For that reason a pyrex glass sample which could be drawn successfully at 880° C to 890° C was used. In that temperature range the self-luminosity is substantially less than in the 2000° C range required to melt and draw fused silica.

With the room darkened the relevant portion of the far field caustic could be seen on a ground glass screen when reflected from the cold (solidified) sample. The $CO_2$ drawing laser was then activated and, as the temperature of the glass in the drawdown zone was brought to its melting point and the drawing operation initiated, the location of the caustic could be seen to shift. Photographs of the far field caustic pattern were recorded during continuous fiber drawing at a rate of 94 cm/sec. The resolution and contrast were sufficient to permit identification of the position of the caustic within 0.5 mm, or an angular resolution of approximately $4.5 \times 10^{-4}$ radians. These photographs were recorded on Type 52 Polaroid film with shutter speeds of 1/50 or 1/100 second. During the initial stages of drawing the fiber diameter varied slowly between $1.34 \times 10^{-4}$ and $1.42 \times 10^{-4}$ mm. Simultaneously a slow 1 cm oscillation in the caustic position, representing a change of only $9 \times 10^{-4}$ in the maximum gradient of the drawdown, was observed.

CONCLUSION

In conclusion, we can see that there are a number of caustics which can be used to study the geometry of melt zones in fiber drawing. They can be used both to identify and to differentiate between different melt-zone geometries. While we have been primarily concerned with symmetric melt zones and materials with uniform optical properties, this technique may have been extended to evaluate the effects of various melt zone asymmetries, and may be furter extended to handle problems associated with nonuniform optical properties such as found in graded-index fibers.

Clearly the caustic technique is suited to monitoring the drawdown zone in a laser drawing apparatus where optical access can readily be found. The technique has several advantages in addition to its potentially low cost, high resolution and excellent sensitivity. First, it is non-contacting and well suited to dynamic processes. Second, as long as the drawdown zone lies within the width of the illuminating beam, which is easily arranged, the caustic pattern is relatively insensitive to changes in the axial location of the inflection point. This assures a singular dependence of the response on the gradient alone and simplifies alignment. Thirdly, while a single external beam arrangement may be inaccurate due to assymmetries in the drawing, an array of collimated external illumination beams, or a single external beam, can be arranged using simple optics to provide an azimuthal survey of the drawdown zone as a monitor of rotational symmetry. Certainly this would provide an immediate and highly sensitive monitor of conditions determining the geometry of the finished fiber.

As previously discussed, a perfectly uniform fiber may not always be desired in optical fiber drawing. An example would be the proposed development of optical fibers with controlled perturbations that are introducced deliberately during drawing in order to achieve better mode coupling in service. Such a process would require a very sophisticated control monitor which was as immediate to the process and as rapid in response as possible — a natural application of the optical caustic technique.

Figure 10A:
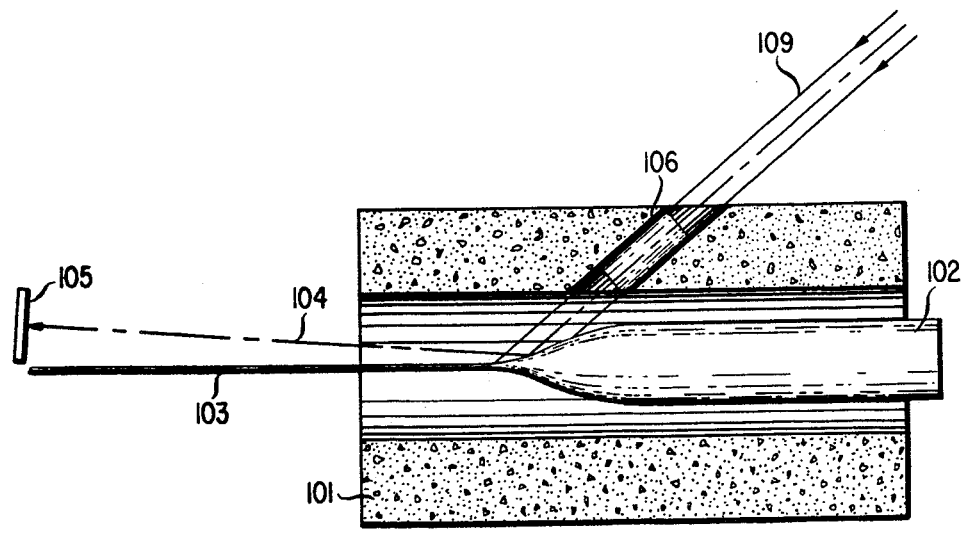
Figure 10B:
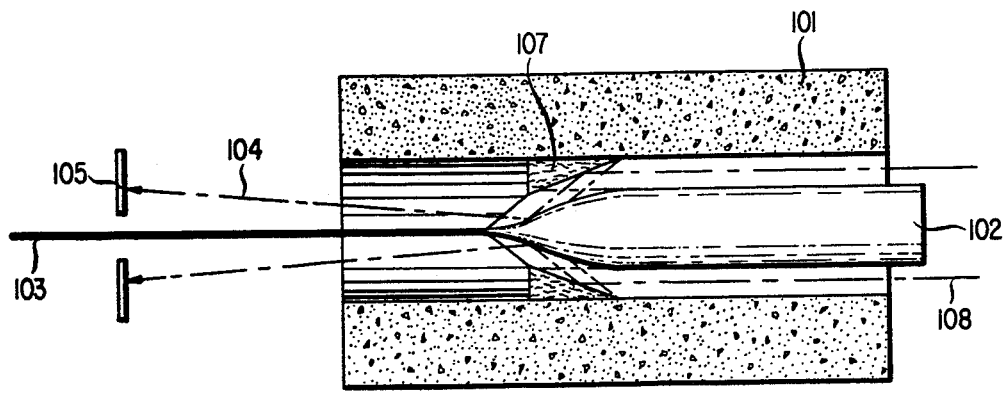

Finally, this technique may be applied to either conventional or induction furnace drawing operations. Either windows or an internal ring mirror (either cooled or of a higher melting point refracting material than the glass being drawn) could be used as in FIG. 10. In FIG. 10, 101 is the drawing furnace, 102 is the optical fiber preform, 103 is the fiber, 104 is the caustic ray, and 105 is an appropriate detector. In FIG. 10a, 106 is a furance window through which the external collimated beam 109 is made incident on the preform. In FIG. 10b, the beam 108 is made externally incident on the drawdown zone by means of the mirror 107. Both of these embodiments may be used in conjunction with internal illumination of the drawdown zone by means of the same, or another, beam. If a second beam is used the caustics associated with the internal and external beams may be isolated by using different wavelength beams and filtered detectors.

What is claimed is:

1. A method of fabricating an optical fiber comprising:
    heating a portion of an optical fiber preform thereby softening it sufficiently so as to enable drawing;

drawing the optical fiber preform into an optical fiber while controlling one or more drawing parameters;

illuminating the optical fiber preform during the drawing process to yield at least one caustic ray emanating from the curved region of the drawdown zone;

detecting the at least one caustic ray emanating from the curved region of the drawdown zone;

monitoring variations in the propagation direction of the at least one caustic ray during the drawing process; and controlling the physical characteristics of the drawdown zone, by controlling at least one drawing parameter in response to the monitoring of the at least one caustic ray.

2. The method of claim 1 wherein the optical fiber preform is illuminated with optical radiation.

3. The method of claim 1 wherein the interior of the optical fiber preform is illuminated with approximately axial optical radiation.

4. The method of claim 3 wherein the upstream two-intercept caustic is monitored.

5. The method of claim 3 wherein the downstream three-intercept caustic is monitored.

6. The method of claim 1 wherein the exterior of the optical fiber preform is externally illuminated.

7. The method of claim 6 wherein the inflection point slope of the optical fiber preform drawdown zone is determined.

8. The method of claim 1 wherein the optical fiber preform is drawn using an oven drawing process.

9. The method of claim 1 wherein the optical fiber preform is drawn using a laser drawing process.

10. The method of claim 9 wherein the optical fiber is drawn with controlled and periodic variations in diameter.

11. The method of claim 1 wherein the optical fiber preform is of nonuniform composition.

12. The method of claim 11 wherein the optical fiber preform is graded.

* * * * *

UNITED STATES PATENT AND TRADEMARK OFFICE
CERTIFICATE OF CORRECTION

PATENT NO. : 4,102,661

DATED : July 25, 1978

INVENTOR(S) : Thomas D. Dudderar and Peter G. Simpkins

It is certified that error appears in the above-identified patent and that said Letters Patent are hereby corrected as shown below:

The title,"Caustic Ray Use of the Drawdown Zone of an Optical Fiber Preform to Control the Drawing of the Fiber" should read -- Caustic Ray Analysis of the Drawdown Zone of an Optical Fiber Preform --.

Signed and Sealed this

Twenty-fourth Day of April 1979

[SEAL]

Attest:

RUTH C. MASON
*Attesting Officer*

DONALD W. BANNER
*Commissioner of Patents and Trademarks*